April 20, 1965 A. A. URBAN 3,179,818
TIME DELAY CIRCUITS
Filed Oct. 29, 1962

INVENTOR.
A. A. URBAN
BY F. J. Pisarra
ATTORNEY

United States Patent Office 3,179,818

Patented Apr. 20, 1965

3,179,818

TIME DELAY CIRCUITS

Alexander A. Urban, Brooklyn, N.Y., assignor to Allied Control Company, Inc., New York, N.Y., a corporation of New York Filed Oct. 29, 1962, Ser. No. 233,807
15 Claims. (Cl. 307—88.5)

This invention relates to time delay circuits adapted to permit actuation of a variety of operating and/or control circuits and instrumentalities at a fixed time interval after the application of a predetermined input voltage.

It is an object of the present invention to provide time delay circuits which are capable of producing delays of extremely short as well as extremely long duration.

It is another object of the present invention to provide time delay circuits of the aforesaid type which are highly reliable in operation over wide ranges of ambient temperatures and the reliability and effectiveness of which are not affected by changes in ambient temperature.

A further object of the present invention is the provision of such time delay circuits which are readily adaptable for use in a wide variety of arrangements, both where the input voltage applied rises to its maximum value from zero and where it rises to its maximum value from a finite value greater than zero which is continuously applied to the circuit.

A still further object of the present invention is to provide time delay circuits of the character indicated which are greatly simplified in construction, highly sensitive in operation, relatively inexpensive to produce and yet possessed of the capacity to withstand the rigors of extended use under highly adverse environmental and operating conditions.

The foregoing and other objects, characteristics and advantages of the present invention will be more clearly understood from the following detailed description thereof when read in conjunction with the accompanying drawings, in which.

Figures 1, 2, 3, 4:
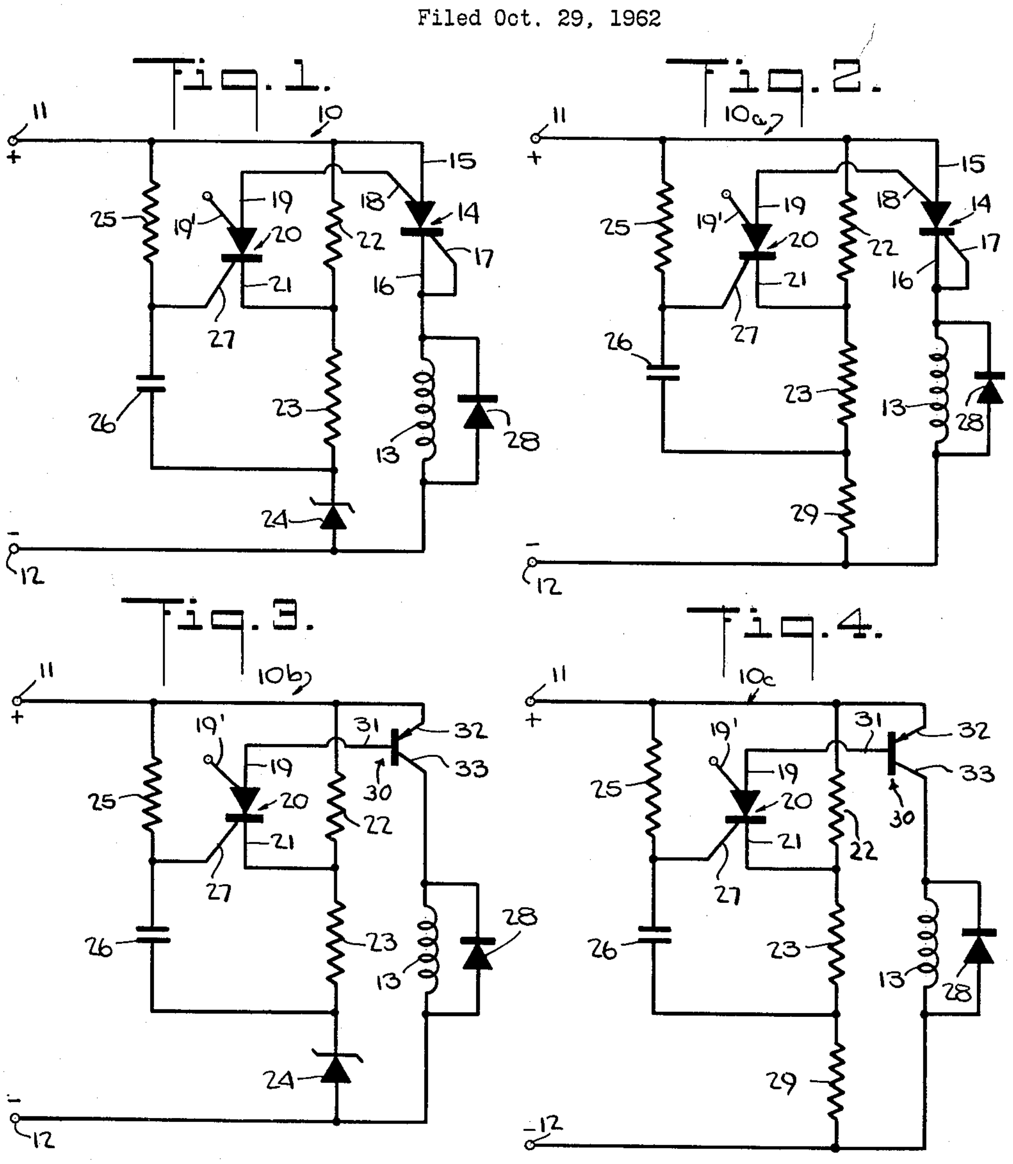
FIG. 1 is a diagram of a time delay circuit according to one aspect of the present invention.
FIG. 2 is a diagram of a slightly modified version of the circuit shown in FIG. 1.
FIG. 3 is a diagram of a time delay circuit according to another aspect of the present invention.
FIG. 4 is a diagram of a slightly modified version of the circuit shown in FIG. 3.

Referring now first to FIG. 1, the time delay circuit 10 includes a pair of input terminals 11 and 12 to which a source of D.C. energizing voltage is adapted to be connected. It will be understood that this source of voltage may be constituted by a D.C. battery or like D.C. generating device or by the output of a suitable rectifier arrangement associated with a source of A.C. potential. The load 13, shown merely by way of example as the coil of a relay or a solenoid, is connected across the voltage source in series with a silicon controlled switch 14, the anode 15 of the controlled switch being connected to the positive terminal 11, and the cathode 16 of the controlled switch being connected to the coil 13. The cathode gate 17 of the controlled switch is shorted to the cathode 16 for a reason to be more fully explained presently.

The anode gate 18 of the controlled switch 14 is connected to the anode 19 of a second silicon controlled switch 20. The cathode 21 of the controlled switch 20 is connected to the junction terminal of a pair of resistors 22 and 23 which are connected across the voltage source 11–12 in series with one another and with a Zener diode 24. Connected in parallel with the voltage divider constituted by the resistors 22 and 23 is a resistance-capacitance charging circuit including a series-connected resistor 25 and capacitor 26, the former being connected to the positive terminal 11 and the latter to the junction terminal of the resistor 23 and the Zener diode 24. The cathode gate 27 of the controlled switch 20 is connected to the junction terminal of the resistor 25 and the capacitor 26, but the anode gate 19′ is left open, i.e. not connected to any part of the circuit.

The silicon controlled switches 14 and 20 are identical four-terminal semiconductor devices, generally known as NPNP transistors. Such a device may be thought of as two transistors, one of the NPN type and the other of the PNP type, with the base of the NPN transistor being connected to the collector of the PNP transistor, and with the base of the PNP transistor being connected to the collector of the NPN transistor, while the emitter of the PNP transistor constitutes the anode of the arrangement, and the emitter of the NPN transistor the cathode. At the same time, the base of the PNP transistor constitutes the anode gate, while the base of the NPN transistor constitutes the cathode gate. Each of the controlled switches employed in the circuit 10 is preferably of the type produced by the General Electric Company under the style numbers 3N58, 3N59 and 3N60, and is widely known by the name "SCS" (the initials of "silicon controlled switch").

A silicon controlled switch is a highly sensitive device which may be caused to conduct current in its anode-cathode circuit by applying suitable potentials to, and permitting suitable low currents to flow through, either the cathode gate or the anode gate. The "SCS" is so constructed that a cathode gate current as small as 1 microampere will suffice to cause the "SCS" to conduct or turn on. At the same time, however, the inherent leakage current across the "SCS" is generally at least that high and may be on the order of several microamperes at elevated temperatures. It is to prevent a possible premature "turn-on" of the "SCS" as a function of these characteristics, and also to eliminate the "$dV/dT$" effect, that the cathode gate 17 of the controlled switch 14 is shorted to the cathode 16 so that there exists a zero potential between the gate and the cathode. As a concomitant, therefore, the controlled switch 14 will conduct only when the desired potential (negative with respect to the anode 15) is applied to the anode gate 18.

The "SCS" 20, by way of contradistinction, is arranged to be caused to conduct by the application of a suitable potential, also known as the "firing voltage," to its cathode gate 27. As clearly shown in FIG. 1, the anode gate 19′ of the controlled switch 20 is left open. Thus, the latter is effectively operated in the manner of a controlled rectifier, a device which is also a NPNP transistor but without an anode gate and is widely known under the name "SCR" (the initials of "silicon controlled rectifier"). The "SCS" 14 connected and arranged as shown is, in fact, usually referred to as a "complementary 'SCR' configuration."

In operation, the circuit 10 of FIG. 1 is particularly well suited for use with a system in which a finite base voltage, which is less than the voltage required to energize the load 13, is applied continuously between the terminals 11 and 12, and in which the load is energized only when the total applied voltage rises to the energized value. Merely by way of example, the circuit 10 may be employed to control the actuation of an overvoltage relay associated with a power generating dynamo the output of which (in D.C. form) is applied to the terminals 11 and 12. If the said output is within the rating of the dynamo, the voltage applied to the circuit 10 remains below the reverse bias breakdown voltage of the Zener diode 24. As long as this condition obtains, no current can flow through the voltage divider 22–23 since the Zener diode effectively presents an open circuit, and thus the capacitor 26 does not charge.

Should the output of the dynamo exceed the rated value, however, as might happen if the load were suddenly to be disconnected from the dynamo, the voltage applied to the terminals 11 and 12 will rise, and, as soon as it exceeds the breakdown voltage of the Zener diode, the latter begins to conduct heavily. The capacitor 26 accordingly begins to charge at a rate determined by its capacitance and the resistance of resistor 25. As previously noted, the arrangement of the device 20 acting as a controlled rectifier is such that it conducts no current, i.e. it will not turn on, until the voltage between the cathode gate 27 and the cathode 21 equals the firing voltage. With the Zener diode 24 conducting, the voltage developed across the resistor 23 initially provides a negative (and current-blocking) bias between the cathode gate 27 and cathode 21.

Assuming now that the dynamo malfunction continues for an appreciable and potentially dangerous time interval, larger than the charging period of the capacitor 26, the voltage across the capacitor 26 ultimately rises to a value which exceeds the said negative bias by an amount equal to the firing voltage. As soon as this happens, the "SCS" 20 conducts and its anode current is applied to the anode gate 18 of the "SCS" 14 so as to turn the latter on. Substantially the full energizing voltage is now applied to the relay coil 13, causing the latter to interrupt the dynamo operation in any desired manner until normal conditions are restored. Whenever the voltage applied to the terminals 11 and 12 drops to essentially zero level, the anode current of the device 20 stops and the "SCS" 14 is turned off, de-energizing the relay 13. It will be understood, of course, that if the duration of the malfunction is less than the charging period of the capacitor, the relay 13 will never become energized at all.

In an actual circuit arrangement of this type designed for use with a dynamo, each of the resistances 22 and 23 is 800 ohms, the resistance 25 is 5.1 kiloohms, the capacitance 26 is a low leakage tantalum capacitor of 33 microfarads, and the breakdown rating of the Zener diode is 19 volts. The connections between the dynamo and the circuit 10 are such that an input of 17 volts is applied to the terminals 11 and 12 when the dynamo is operating normally. The "SCS" 14 must, of course, be rated for the value of current required to energize the coil 13.

The circuit works with a time delay of 180 milliseconds when the input voltage at the terminals 11 and 12 rises to 24 volts. The voltage divider 22–23–24 thus provides a total of about 5 volts across the resistors 22 and 23 and therefore about 2.5 volts across the bias resistor 23. The actual division of voltage between the resistors 22 and 23 is, of course, predetermined in accordance with the inverse voltage rating of the device 20.

For different time delays or operating conditions, other relationships between the various circuit parameters will necessarily have to be established.

The circuit 10, when used in association with an overvoltage relay 13, is possessed of other advantages. The "SCS" 14 requires only a very small holding current at the anode gate 18 in order to remain in its conducting state, and actually will continue to conduct even if the voltage applied to the terminals 11 and 12 drops somewhat from its maximum value but does not return to its normal value. Thus, the present invention not only prevents a premature turn-on of the "SCS" 14, but also ensures that there will be no premature "turn-off" of the "SCS" 14 and consequent de-energization of the relay 13. Possible damage to the circuit components by the large coil surge voltages developed when circuit 10 is turned off is prevented by the connection of a diode 28 across the coil 13.

In addition, the circuit is not affected by large temperature variations or by being subjected to relatively high temperatures. As is well known, the leakage current through a "SCR" or "SCS" increases as the ambient temperature increases. In the case of the circuit 10, this could lead to a premature turn-on of the device 20. This potential drawback is avoided, according to the present invention, by the fact that the cathode gate 27 is directly connected to the capacitor 26. As a result, any leakage current flowing through the cathode gate 27 will go to charge the capacitor. Inasmuch as the latter, however, is subjected to the same temperature rise as the device 20, and since an increase in temperature also increases the leakage of charge across the capacitor, the two leakage factors tend to compensate for one another, so that a premature turn-on of the device 20 is effectively inhibited while the overall time delay remains substantially unaffected.

Other uses for the time delay circuit 10 will readily suggest themselves to those skilled in the art. Merely by way of example, it may be employed in the actuation of components such as rockets or other instruments of controlled astronautical vehicles or missile devices, e.g., space capsules, ballistic missiles, etc. In such cases, the energizing voltage may be applied to the terminals 11 and 12 either at full value during the readying of the vehicle for flight or by the transmission of a suitable signal to the vehicle from a ground or other control station, such signal, upon being received in the vehicle, passing through a suitable rectifier and filter circuit before being applied to the delay circuit. Regardless of the specific means with which the delay circuit is associated, of course, the continuous application of a base voltage is not an indispensable requirement. In the absence of such a base voltage, however, the magnitude of the input signal or energization potential applied to the terminals 11 and 12 must be sufficient to create the desired voltage drops across the components of the voltage divider 22–23–24.

Where the continuous application of a base voltage is not required, the circuit 10*a* shown in FIG. 2 may be employed. This circuit is a slightly modified and simplified version of the circuit 10 and differs from the latter only in that the Zener diode 24 is replaced by a resistor 29. The operation of the circuit 10*a*, except for the raising of the circuit voltage from an initial value of zero to the desired energizing voltage level, is precisely the same as the operation of the circuit 10 shown in FIG. 1. It will be noted that the circuit of FIG. 2 is not suited for use in a system wherein a substantial base voltage is continuously applied, since the presence of the resistor 29 will allow the capacitor 26 to charge. Again, merely by way of example, this type of circuit may be advantageously employed in an oil burner control system, with the load element 13 being the coil of a solenoid valve in the feed line by which oil is directed to the location of the electrodes.

The circuit 10*b* shown in FIG. 3 again employs the Zener diode 24 of the circuit 10 shown in FIG. 1, but in lieu of the silicon controlled switch 14 employs a transistor 30 (preferably of silicon) having its base 31 connected to the anode 19 of the "SCS" 20 acting as a controlled rectifier, the emitter 32 of the transistor 30 being connected to the positive input terminal 11, and the collector 33 of the transistor 30 being connected to the load 13. A circuit according to this aspect of the present invention is found useful when the load voltage or current is too high for the generally low voltage and current ratings of "SCS" 14. In the arrangement of FIG. 3, when the energizing voltage is sufficient to overcome the reverse bias break-down voltage of the Zener diode 24, the capacitor 26 charges as hereinbefore explained until the voltage across the capacitor exceeds the voltage drop across the resistor 23 by the firing voltage of the device 20. The anode current of the latter then flows through the base of the transistor 30, driving the same fully into saturation and causing current to flow in the emitter-collector circuit of the transistor. As soon as this occurs, the full energizing voltage, minus the small voltage drop across the emitter-collector of the transistor 30, is applied to the load 13 to operate the same. Care must, of course, be taken that both the transistor 30 and the transient suppression diode 28 have sufficient ratings to withstand the full energizing voltage.

The circuit 10*b* of FIG. 3, like the circuit 10 of FIG. 1, is found to be particularly useful in a system where a finite base voltage is continuously applied to the input terminals 11 and 12, although this is not an indispensable prerequisite.

The circuit 10*c* shown in FIG. 4 differs from the circuit 10*b* only in that the Zener diode 24 is replaced by the resistor 29. Thus, like the circuit 10*a* of FIG. 2, circuit 10*c* is designed for use in a system where the normal condition is zero voltage at the terminals 11 and 12, and energization is achieved by applying a potential the magnitude of which is at least equal to the required energizing voltage.

As hereinbefore stated, all of the circuits of FIGS. 1 to 4 are found to be highly reliable and capable of withstanding both relatively high temperatures as well as relatively large temperature changes, due to the fact that the charging circuit 25–26 is directly connected with the cathode gate of the "SCS" 20 acting as a controlled rectifier, so that increases in leakage current in the latter are compensated for by increases in capacitor charge leakage.

Figure 5:
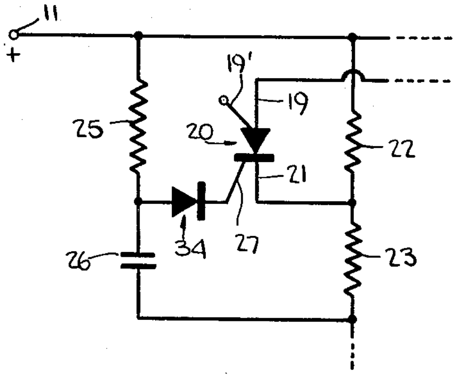
FIG. 5 is a diagram showing a slightly modified form of the charging portion of the circuits shown in FIGS. 1 to 4.

If the circuit is, however, intended for use only at relatively low temperatures and in an environment where it will not be subjected to substantial temperature changes, the charging circuit is slightly modified, as illustrated in FIG. 5. The portion of the time delay circuit shown in FIG. 5 is identical with the corresponding circuit portion shown in FIGS. 1 to 4 except for the fact that a diode 34 is connected between the cathode gate 27 of the device 20 and the junction terminal of the resistor 25 and capacitor 26. The cathode gate 27 is thus isolated from the charging circuit. The characteristics of the diode 34 are such that it will not conduct until the capacitor is completely charged, i.e., until the voltage across the capacitor is equal to the voltage drop across the resistor 23 plus the firing voltage of the device 20. Such an arrangement allows for a greater voltage to be developed across capacitor 26 before "SCS" 20 turns on. This feature allows a smaller value of capacitor 26 to be utilized for a specific time delay. This, however, requires that the voltage rating of the capacitor 26 be increased.

In all of the foregoing circuits, the device 20 has been described to be a silicon controlled switch acting as a controlled rectifier. The use of a "SCS" rather than a "SCR" is preferred due to the fact that the former is much more sensitive than the latter, i.e., it may be actuated by much smaller cathode gate currents (on the order of microamperes) than a "SCR" (which requires cathode gate currents on the order of milliamperes). Should extreme sensitivity not be a necessity, however, the device 20 may be a regular "SCR" rather than a "SCS" the anode gate of which is left open. Wherever the term "controlled rectifier" is employed in this application without qualification, therefore, it is to be interpreted in this broader sense as designating both a regular "SCR" and a "SCS" acting as a controlled rectifier.

The time delay circuits according to the present invention are of greatly simplified construction as compared with heretofore known arrangements of this type, and thus are both easier and less expensive to produce. Moreover, besides being highly reliable and accurate and usable in connection with a great variety of operating and/or control circuits and instrumentalities, the time delay circuits of this invention are capable of providing a very wide range of time delays, from small fractions of a second to as much as ten minutes.

While there are described and illustrated herein several preferred embodiments of time delay circuits according to the present invention, it is to be understood that the disclosure is representative only and that the said time delay circuits may be changed and modified in a number of ways, none of which involves a departure from the spirit and scope of the present invention as defined in the appended claims.

I claim:

1. A time delay circuit for applying a delayed energizing voltage to a load, comprising a pair of input terminals adapted to be connected to a source of input potential, a multi-element semiconductor device having its output current circuit connected in series with the load across said input terminals, a voltage divider connected across said input terminals, a resistance-capacitance charging circuit connected between one of said input terminals and a first point of said voltage divider, and a controlled rectifier having an anode, a cathode and a cathode gate, said anode being connected to the input current circuit of said semiconductor device, said cathode being connected to a second point of said voltage divider, and said cathode gate being connected to said charging circuit.

2. A time delay circuit according to claim 1, said charging circuit comprising a charging resistor and a capacitor connected in series with one another, said cathode gate of said controlled rectifier being connected to the junction terminal of said charging resistor and said capacitor.

3. A time delay circuit according to claim 2, further comprising a semiconductor diode connected between said cathode gate of said controlled rectifier and said junction terminal of said charging resistor and said capacitor.

4. A time delay circuit according to claim 1, said voltage divider comprising first and second resistors and a Zener diode connected in series with one another, the junction terminal of said first and second resistors constituting said second point of said voltage divider, and the junction terminal of said Zener diode and said second resistor constituting said first point of said voltage divider.

5. A time delay circuit according to claim 4, said charging circuit comprising a charging resistor and a capacitor connected in series with one another, said cathode gate of said controlled rectifier being connected to the junction terminal of said charging resistor and said capacitor, the remaining terminal of said charging resistor being connected to said one input terminal, and the remaining terminal of said capacitor being connected to the junction terminal of said second resistor and said Zener diode.

6. A time delay circuit according to claim 1, said voltage divider comprising first, second and third resistors connected in series with one another, the junction terminal between said first and second resistors constituting said second point of said voltage divider, and the junction terminal of said second and third resistors constituting said first point of said voltage divider.

7. A time delay circuit according to claim 6, said charging circuit comprising a charging resistor and a capacitor connected in series with one another, said cathode gate of said controlled rectifier being connected to the junction terminal of said charging resistor and said capacitor, the remaining terminal of said charging resistor being connected to said one input terminal, and the remaining terminal of said capacitor being connected to the junction terminal of said second and third resistors.

8. A time delay circuit according to claim 1, said semiconductor device comprising a silicon controlled switch having an anode, an anode gate, a cathode and a cathode gate, the anode-cathode circuit of said silicon controlled switch being connected in series with the load, said anode gate of said silicon controlled switch being connected to said anode of said controlled rectifier, and said cathode gate of said silicon controlled switch being shorted to said cathode of the latter.

9. A time delay circuit according to claim 1, said semiconductor device comprising a transistor having an emitter, a collector and a base, the emitter-collector circuit of said transistor being connected in series with the load, and said base of said transistor being connected to said anode of said controlled rectifier.

10. A time delay circuit according to claim 9, said transistor being a silicon transistor.

11. A time delay circuit according to claim 1, said controlled rectifier comprising a silicon controlled switch the anode gate of which is left open.

12. A time delay circuit for applying a delayed energizing voltage to a load, comprising a pair of input terminals adapted to be connected to a source of input potential, a silicon controlled switch having an anode, a cathode, an anode gate and a cathode gate, the anode-cathode circuit of said silicon controlled switch being connected in series with the load across said input terminals, said cathode gate of said silicon controlled switch being shorted to said cathode of the same, first and second resistors and a Zener diode connected in series with one another across said input terminals, a controlled rectifier having an anode, a cathode and a cathode gate, said anode gate of said silicon controlled switch being connected to said anode of said controlled rectifier, said cathode of said controlled rectifier being connected to the junction terminal of said first and second resistors, and a charging circuit comprising a charging resistor and a capacitor connected in series with one another, said cathode gate of said controlled rectifier being connected to the junction terminal of said charging resistor and said capacitor, the remaining terminal of said charging resistor being connected to said one input terminal, and the remaining terminal of said capacitor being connected to the junction terminal of said second resistor and said Zener diode.

13. A time delay circuit for applying a delayed energizing voltage to a load, comprising a pair of input terminals adapted to be connected to a source of input potential, a silicon controlled switch having an anode, a cathode, an anode gate and a cathode gate, the anode-cathode circuit of said silicon controlled switch being connected in series with the load across said input terminals, said cathode gate of said silicon controlled switch being shorted to said cathode of the same, first, second and third resistors connected in series with one another across said input terminals, a controlled rectifier having an anode, a cathode and a cathode gate, said anode gate of said silicon controlled switch being connected to said anode of said controlled rectifier, said cathode of said controlled rectifier being connected to the junction terminal of said first and second resistors, and a charging circuit comprising a charging resistor and a capacitor connected in series with one another, said cathode gate of said controlled rectifier being connected to the junction terminal of said charging resistor and said capacitor, the remaining terminal of said charging resistor being connected to said one input terminal, and the remaining terminal of said capacitor being connected to the junction terminal of said second and third resistors.

14. A time delay circuit for applying a delayed energizing voltage to a load, comprising a pair of input terminals adapted to be connected to a source of input potential, a transistor having a base, an emitter and a collector, the emitter-collector circuit of said transistor being connected in series with the load across said input terminals, first and second resistors and a Zener diode connected in series with one another across said input terminals, a controlled rectifier having an anode, a cathode and a cathode gate, said base of said transistor being connected to said anode of said controlled rectifier, said cathode of said controlled rectifier being connected to the junction terminal of said first and second resistors, and a charging circuit comprising a charging resistor and a capacitor connected in series with one another, said cathode gate of said controlled rectifier being connected to the junction terminal of said charging resistor and said capacitor, the remaining terminal of said charging resistor being connected to said one input terminal, and the remaining terminal of said capacitor being connected to the junction terminal of said second resistor and said Zener diode.

15. A time delay circuit for applying a delayed energizing voltage to a load, comprising a pair of input terminals adapted to be connected to a source of input potential, a transistor having a base, an emitter and a collector, the emitter-collector circuit of said transistor being connected in series with the load across said input terminals, first, second and third resistors connected in series with one another across said input terminals, a controlled rectifier having an anode, a cathode and a cathode gate, said base of said transistor being connected to said anode of said controlled rectifier, said cathode of said controlled rectifier being connected to the junction terminal of said first and second resistors, and a charging circuit comprising a charging resistor and a capacitor connected in series with one another, said cathode gate of said controlled rectifier being connected to the junction terminal of said charging resistor and said capacitor, the remaining terminal of said charging resistor being connected to said one input terminal, and the remaining terminal of said capacitor being connected to the junction terminal of said second and third resistors.

References Cited by the Examiner

UNITED STATES PATENTS

| | | | |
|---|---|---|---|
| 2,548,818 | 4/51 | Rambo | 317—31 |
| 3,049,632 | 8/62 | Staples | 307.88.5/21.5 |

DAVID J. GALVIN, *Primary Examiner.*